United States Patent [19]

Rose

[11] Patent Number: 5,309,513
[45] Date of Patent: May 3, 1994

[54] TELEPHONE SYSTEM WITH UBIQUITOUS AGENTS

[75] Inventor: James D. Rose, Fayetteville, Ga.

[73] Assignee: Rockwell International Corporation, El Segundo, Calif.

[21] Appl. No.: 907,997

[22] Filed: Jul. 2, 1992

[51] Int. Cl.5 .......................... H04M 3/00; H04Q 3/64
[52] U.S. Cl. ...................................... 379/265; 379/266; 379/309
[58] Field of Search ............... 379/210, 211, 212, 214, 379/265, 266, 309, 218

[56] References Cited

U.S. PATENT DOCUMENTS

| | | | |
|---|---|---|---|
| 4,620,066 | 10/1986 | Bushnell et al. | 379/266 X |
| 4,737,983 | 4/1988 | Frauenthal et al. | 379/223 X |
| 4,757,529 | 7/1988 | Glapa et al. | 379/214 X |

Primary Examiner—James L. Dwyer
Assistant Examiner—Harry S. Hong
Attorney, Agent, or Firm—C. B. Patti; H. F. Hamann

[57] ABSTRACT

A telephone system (10) having an automatic call distributor (12a-c) for receiving calls and distributing the calls to at least one ubiquitous agent associated with the automatic call distributor (12a-c), a switch (20) connected to the automatic call distributor (12a-c), and a device (16) for controlling the switch (20) for connecting the switch (20) to the ubiquitous agents.

7 Claims, 1 Drawing Sheet

TELEPHONE SYSTEM WITH UBIQUITOUS AGENTS

BACKGROUND OF THE INVENTION

The present invention relates to automatic call distributor systems.

Before the present invention, telephone systems have been provided with a plurality of automatic call distributors (ACD) comprising a switch for routing incoming calls to a plurality of agents associated with each of the automatic call distributors. At certain times, the number of calls to any given call distributor may be excessive, and the callers are placed in a line (queue) for answering. Routing calls from a given automatic call distributor in an overflow manner from the originating automatic call distributor to another automatic call distributor is sometimes attempted if the call can be accepted at the other ACD. Such an overflow of calls may, for example, be required in an emergency situation, such as an ice storm when answering personnel (agents) cannot get to work to answer the telephone calls. However, each of the calls which are overflowed from one ACD to another ACD have required at least one trunk line for each call transferred which imposes an excessive need for trunks and equipment on the telephone system. In addition, the overflow of calls required that a sufficient number of agents at the other ACD be available to answer the calls to permit such overflow to be practical.

In addition, such overflow from one ACD to another ACD is relatively inefficient since it does not make the maximum use of the various agents servicing the ACDs in a multi-node ACD network. Further, if an answering agent is required to establish a conference between the caller and a third party it is presently necessary for the agent servicing the call at the second ACD to return the call on a trunk line to the originating ACD, such that the overflow calls are routed from the originating ACD to a second ACD and back to the originating ACD, which requires yet another trunk line thus posing additional equipment requirements of trunks and telephone system equipment. Further, many calls such as operator service calls send a series of identification and control digits to the switch during initial call set up. If the call cannot be answered in the originating ACD/switch for any reason, the identifier control digits must be regenerated and forwarded (overflowed) to another switch. This imposes additional requirements on the telephone system but is needed for proper operation and disposition of the overflow answered call.

In many instances, it would be desirable to connect incoming calls to an agent with special skills, such as an agent having knowledge of a particular foreign language, product, or caller service requirement. This invention would allow the calls requiring the special skill to be answered in the originating ACD by an agent with the special skill if one is available and connected to the network.

The use of remote agents to answer calls for a "closed" ACD center is in not an accepted solution because remote agents are dedicated to serving only the center from which they are remoted. In other words, they are physically remoted but electronically the same as local agents. Assume a call center location with agents remoted from one or more ACD call centers. If traffic to the ACD center is low (or none at all), the remoted agents connected to that ACD are idle. At the same time, other agents remoted from the other ACD call centers physically next to the "idle" remoted agents may be swamped with calls from their respective ACD call centers. Without physically moving to a new position, which is electronically connected to the "busy" center, the "idle" remote agents cannot answer an incoming call. If the agent does move to a new position, his assistance is still limited to only that one center which is connected to the position. Other call centers in the network with a call queue are not capable of being helped by the idle agents. The invention allows each ubiquitous agent position to be assigned to the call center with the greater need on a real time basis.

Historically, moving incoming calls to other call centers by the overflow method is used to improve service levels, utilize idle agents, and/or to close a call center after hours. This overflow method is acceptable when dealing with basic traffic (seize and ring), low traffic periods during off-hours, and/or during peak call volume periods. Operator Service traffic and calls with data and control digits as part of the call supervision are complex and cannot be routed over standard overflow circuits with existing ACD software. Also, the number of circuits required to provide full contingency coverage for emergencies, such as ice storms, with conventional diversion is one inter-switch circuit for each incoming trunk, and would require an excessive amount of circuits to perform a 100% contingency coverage. With the invention, a circuit (or fractional circuit with multiplexing) for each agent is required. (The trunk circuit to agent ratio is typically 1.2 to 1 in most call centers).

SUMMARY OF THE INVENTION

A principal feature of the present invention is the provision of an improved telephone system of simplified construction.

The telephone system of the present invention comprises, an automatic call distributor for receiving calls and distributing the calls to the first available qualified agent associated with the automatic call distributor. Agents are connected to the ACD via computer controlled multiplexed telephone circuits/trunks.

A feature of the invention is the provision of controlling the ubiquitous agents by means of a computer controlled multiplexer.

Yet another feature of the invention is that the automatic call distributor supplies information concerning the call and the call center to the computer. Thus, the computer makes a decision of when (and how many) agents to assign to the call center.

Still another feature of the invention is that any connected agents may supply information including skill levels and abilities to the computer. Thus, the computer may assign an agent with a special skill to a caller requiring a special service, skill, or ability such as a foreign language.

Still another feature of the invention is that the computer may connect any one of the agents connected to the multiplexer to a given automatic call distributor.

Another feature of the invention is that the number of agents assigned to an ACD may be 0 at any given time, and may be changed to one or more if and when an incoming call(s) occurs.

Thus, a feature of the invention is that the office (call center) may be closed and unmanned and still distribute calls from the associated automatic call distributor to a set of qualified agents.

A further feature of the invention is that the system provide assistance to the given automatic call distributor in the network in the event of an excessive number of calls to that automatic call distributor.

Another feature of the invention is that the system may assign agents to the call center during an emergency, such as an ice storm or inclement weather.

Yet another feature of the invention is that the system handles incoming calls to the network in an improved and more efficient manner. Each of the ACD systems connected to the multiplexed agents may maintain the same answering service levels by allowing the computer to assign more (less) agents to call centers according to call arrival rates.

Still another feature of the invention is that the telephone system may be constructed at a reduced cost. Multiple call centers may share common hardware resources at the remote agent location.

Yet another feature of the invention is that the system may have a plurality of automatic call distributors which are each serviced by separate sets of local agents which may share the common resources of the ubiquitous agents.

Another feature of the invention is that the system may connect any call to any of the automatic call distributors to any one of the ubiquitous agents.

Still another feature of the invention is that the system connects a given automatic call distributor call to a selected ubiquitous agent while bypassing all of the other automatic call distributors. The call is answered in the originating ACD and is not overflowed or diverted to another ACD.

Yet another feature of the invention is the ability of the system to service the calls with a limited number of unique skills for a maximum number of call centers. A one-of-a-kind agent may be used to service calls to any and all ACD systems connected to the network.

A further feature of the invention is that the system provides contingency coverage for a call center which cannot be manned during natural disasters.

Still another feature of the invention is that the system permits any of the call centers to be closed for holidays, after hours, for agent group meetings, or periods when traffic does not require someone to answer the calls on a full-time basis. Calls to the center will be serviced by the ubiquitous agents at the remote location.

Thus, another feature of the invention is that the system may significantly lower the cost associated with maintaining the agents which are present for answering the calls.

Further features will become more fully apparent in the following description of the embodiments of the present invention, and from the appended claims.

DESCRIPTION OF THE PREFERRED EMBODIMENTS

Figure 1:
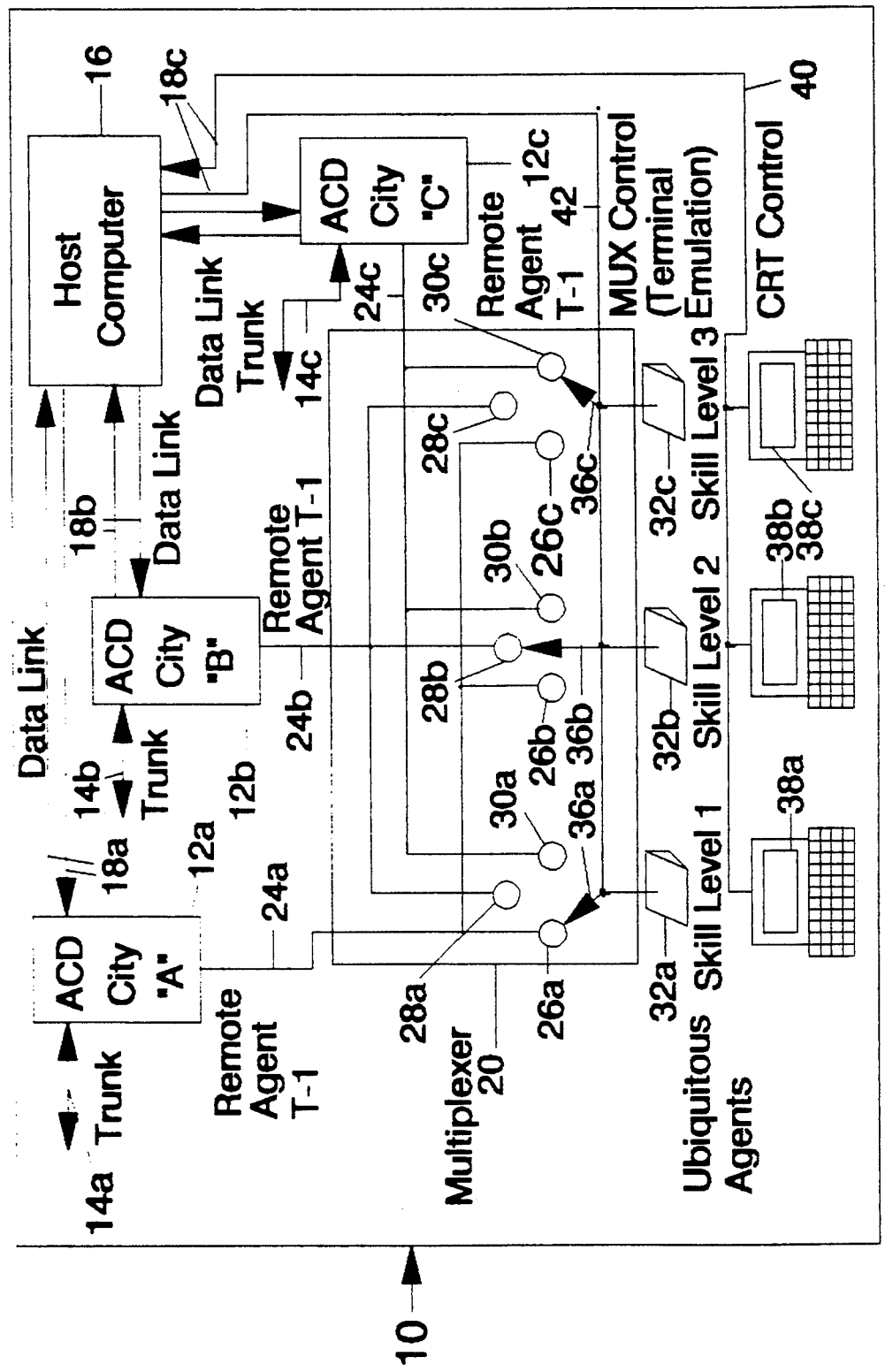
FIG. 1 is a block diagram of a telephone system of the present invention.

Referring now to FIG. 1, there is shown a telephone system network generally designated 10 having a plurality of Automatic Call Distributors (ACD) 12a, 12b, and 12c each comprising a switch for connecting telephone calls on the associated trunk lines 14a, 14b, and 14c to qualified agents. The system 10 has a host computer 16 or a Central Processing Unit (CPU) having a randomly addressable memory (RAM) and a Read Only Memory (ROM). As shown, the system 10 has a plurality of data links 18a, 18b, and 18c connecting the ACDs 12a–c, respectively, to the computer 16.

The system 10 also has a multiplexer 20 (MUX) having a plurality of switches. The MUX has an electronic switch for each agent which is controlled by the host computer 16. For simplicity, 3 of the switches 36a, 36b, and 36c are illustrated. As shown, the ACD 12a is connected by a T-1 span line 24a to contacts 26a–c of the switches 36a–c of the multiplexer 20. The ACD 12b has a T-1 span line 24b connected to contacts 28a–c of the switches 36a–c of the multiplexer 20, and the ACD 12c has a T-1 span line 24c connected to contacts 30a–c of the switches 36a–c of the multiplexer 20.

The system 10 also has a plurality of agent consoles (stations) illustrated as 32a, 32b, and 32c for operation by a plurality of agents which may have special skills, such as knowledge of a foreign language. The stations 32a–c have associated personal computer (PC)/cathode ray (CRT) screens and keyboards 38a, 38b, and 38c connected to the host computer 16. As shown, the keyboards and displays 38a–c of the stations 32a–c are connected to the computer 16 over CRT control lines 40. As will be seen below, the computer 16 controls the settings of the switches 36a–c over a MUX control line 42, such that the respective contacts of 26a–c, 28a–c, and 30a–c in the multiplexer assigns a ubiquitous agent(s) to ACD 12a–c.

In use, telephone calls are placed on the trunk lines 14a–c to the respective ACD 12a–c which in turn usually directs the calls to agents assigned to the ACD systems. As shown, the ACDs 12a–c provide the computer 16 with information concerning the incoming calls over the respective data links 18a–c. The data links 18a–c also provide the computer 16 with additional information for the respective ACD, such as identification codes, the average speed of answer, number of calls offered, and the agents available. The information supplied to the computer 16 by the ACD may also include payphone information, credit card information, telephone number, a given 800 number, language requirements, such as a foreign language spoken, and any other such information required by the computer 16 to control the system 10, and to route the call according to the control information collected from the incoming trunk.

Also, the operators at the stations 32a–c, termed ubiquitous agents, may supply information to the computer 16 over the lines 40 by the keyboard and displays 38a–c, such as the particular skills of the agents at the stations 32a–c, such as knowledge of particular product or foreign languages, for each of the agents. Individual agent skill is entered on the keyboards 38a–c and sent via the CRT control 40 to the host computer 16, when agents first sign in and begin the work shift.

Based upon the information supplied to the computer 16 from the ACDs incoming call and keyboards 38a–c, the computer 16 may select the switches 36a–c to connect any ubiquitous agent to any of the ACDs 12a–c. The computer 16 thus controls the wipers 36a–c of the switches 22a–c by connecting these wipers 36a–c to a desired contact 26a–c, 28a–c or 30a–c. In this manner, the computer 16 controls the connection of a ubiquitous agent over a T-1 span line 24a–c to the ACD which has an incoming call.

Thus, for example, if an excessive number of calls are received at any given ACD, the computer 16 connects agents 32a-c through the multiplexer 20 to the agents at the stations 32a-c. If, for example, the data supplied from the ACDs indicates the need of a special operator, such as one having knowledge of a particular foreign language, the computer 16 may connect a ubiquitous agent, say 32a, to this ACD to service the call. The next call to another ACD may require the same skill and the computer 16 via MUX control 42 switches the agent 32a to this ACD. In a further example, during an emergency situation, such as an ice storm, the computer 16 may connect any (or all) of the agents to any of the ACDs receiving calls. In addition, during non-rush times, such as a holiday, evening, or week end, all of the agents usually associated with a given ACD 12a-c may not be present during these low traffic periods. The ACDs may notify the host computer 16 that a call has arrived, and the host computer 16 can assign an agent 32a-c to the ACD receiving the call, thus saving the cost of manning a given ACD 12a-c by agents during usually closed periods.

The computer 16 connects the agents through the multiplexer to other ACDs 12a-c in the network, thus reducing the cost and complexity of the telephone system 10, and also resulting an improved and efficient use of the agents on duty. Thus, it is no longer necessary to cause overflow of calls from one ACD 12a-c to another ACD 12a-c which eliminates the necessity for an excessive number of trunk lines connected between various ACDs 12a-c. Thus, in accordance with the present invention, the computer 16 may connect any of the agents at the stations 32a-c to any of the ACDs 12a-c in an improved and efficient manner while selecting the particular skills, if necessary, from the agents manning the stations 32a-c.

The foregoing detailed description has been given for clearness of understanding only, and no unnecessary limitations should be understood therefrom, as modifications will be obvious to those skilled in the art.

What is claimed is:

1. A telephone system, comprising:
   a plurality of automatic call distributors for receiving and distributing calls in a sequential order;
   multiplexer switch means being connected to each of the automatic call distributors; and
   means for controlling the multiplexer switch means for connecting any of said automatic call distributors to any of a plurality of agent positions, wherein the agent positions can be served by any one of the plurality of automatic call distributors.

2. The system of claim 1 wherein the controlling means comprises a host computer.

3. The system of claim 2 including means for supplying information from each of the automatic call distributors to the computer, and means responsive to the supplying means for controlling the multiplexer switch means to the agent positions.

4. The system of claim 2 including means for supplying information from the agent positions including skill level to the computer.

5. The system of claim 4 including means responsive to the supplying means for controlling the multiplexer switch means to the agent positions.

6. The system of claim 1 wherein the number of agent positions.

7. The system of claim 1 including means for determining priority levels of agents in receiving calls, and means responsive to the determining means for connecting an automatic call distributor to one of said agent positions.

* * * * *